(12) United States Patent
Chelin et al.

(10) Patent No.: US 8,757,541 B2
(45) Date of Patent: Jun. 24, 2014

(54) MEASUREMENT INSTRUMENT SUPPORT INTERPOSED BETWEEN A DRIVE UNIT AND AN AIR INTAKE OF AN AIRCRAFT NACELLE

(75) Inventors: Frédéric Chelin, Encausse (FR); Cedric Leconte, Toulouse (FR); Fabienne Montetagaud, Blagnac (FR)

(73) Assignee: Airbus Operations S.A.S., Toulouse (FR)

( * ) Notice: Subject to any disclaimer, the term of this patent is extended or adjusted under 35 U.S.C. 154(b) by 478 days.

(21) Appl. No.: 12/996,456

(22) PCT Filed: Jun. 3, 2009

(86) PCT No.: PCT/FR2009/051049
§ 371 (c)(1),
(2), (4) Date: Feb. 23, 2011

(87) PCT Pub. No.: WO2010/001009
PCT Pub. Date: Jan. 7, 2010

(65) Prior Publication Data
US 2011/0147534 A1   Jun. 23, 2011

(30) Foreign Application Priority Data
Jun. 6, 2008   (FR) ...................................... 08 53759

(51) Int. Cl.
*B64D 27/00*   (2006.01)
(52) U.S. Cl.
USPC ........................................................ 244/53 B
(58) Field of Classification Search
USPC ................................ 244/53 B; 137/15.1, 15.2
See application file for complete search history.

(56) References Cited

U.S. PATENT DOCUMENTS

| | | | | | |
|---|---|---|---|---|---|
| 5,359,663 | A | * | 10/1994 | Katz | 381/71.2 |
| 5,370,340 | A | * | 12/1994 | Pla | 244/1 N |
| 5,382,134 | A | * | 1/1995 | Pla et al. | 415/119 |
| 5,391,053 | A | * | 2/1995 | Pla et al. | 415/119 |
| 5,415,522 | A | * | 5/1995 | Pla et al. | 415/118 |
| 5,423,658 | A | * | 6/1995 | Pla et al. | 415/118 |
| 5,478,199 | A | * | 12/1995 | Gliebe | 415/119 |
| 5,548,653 | A | * | 8/1996 | Pla et al. | 381/71.2 |
| 5,558,298 | A | * | 9/1996 | Pla et al. | 244/1 N |
| 5,581,054 | A | * | 12/1996 | Anderson et al. | 181/213 |

(Continued)

FOREIGN PATENT DOCUMENTS

FR   2898870 A1   9/2007
GB   2273131 A    6/1994

OTHER PUBLICATIONS

International Search Report, dated Feb. 1, 2010, from corresponding PCT application.

*Primary Examiner* — Tien Dinh
*Assistant Examiner* — Michael Kreiner
(74) *Attorney, Agent, or Firm* — Young & Thompson

(57) ABSTRACT

An aircraft nacelle comprising a power plant having a pipe with an aerodynamic surface, an air intake having an inside pipe with an aerodynamic surface, and an annular support of at least one measuring device having an aerodynamic surface, wherein the annular support is removably-inserted between the power plant and the air intake. In particular, the annular support is inserted downstream of the air intake and upstream of the power plant in a direction of flow of the stream of air, in such a way as to ensure continuity of the aerodynamic surfaces.

5 Claims, 2 Drawing Sheets

(56) References Cited

U.S. PATENT DOCUMENTS

| | | | |
|---|---|---|---|
| 5,584,447 A * | 12/1996 | Pla | 244/1 N |
| 5,590,849 A * | 1/1997 | Pla | 244/1 N |
| 5,618,010 A * | 4/1997 | Pla et al. | 244/1 N |
| 5,692,702 A * | 12/1997 | Andersson | 244/1 N |
| 5,954,169 A * | 9/1999 | Jensen | 188/378 |
| 6,360,989 B1 * | 3/2002 | Maguire | 244/53 B |
| 7,086,219 B2 * | 8/2006 | Stretton et al. | 60/226.1 |
| 7,210,897 B2 * | 5/2007 | Kobayashi | 415/118 |
| 7,503,425 B2 * | 3/2009 | Strunk | 181/214 |
| 2002/0061110 A1 | 5/2002 | Kobayashi | |
| 2010/0232932 A1 | 9/2010 | Vauchel et al. | |

* cited by examiner

MEASUREMENT INSTRUMENT SUPPORT INTERPOSED BETWEEN A DRIVE UNIT AND AN AIR INTAKE OF AN AIRCRAFT NACELLE

This invention relates to a measuring device support inserted between a power plant and an air intake of an aircraft nacelle.

An aircraft propulsion system comprises a nacelle in which a power plant that is connected by means of a mast to the rest of the aircraft is arranged in an essentially concentric manner.

Figure 1:
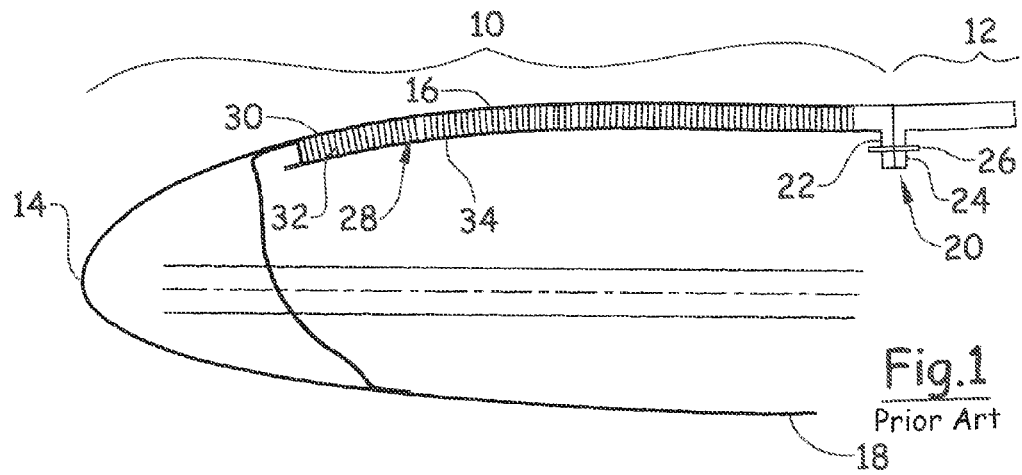

As illustrated in FIG. 1, the nacelle comprises, at the front, an air intake 10 that makes it possible to channel a stream of air into a power plant 12, a first portion of the incoming stream of air, called primary stream, passing through the power plant to participate in the combustion, the second portion of the stream of air, called secondary stream, being entrained by a fan and flowing into an annular pipe that is delimited by the inside wall of the nacelle and the outside wall of the power plant.

The air intake 12 comprises a lip 14 whose surface in contact with the aerodynamic streams is extended inside the nacelle via an inside pipe 16 with essentially circular cross-sections and outside of the nacelle by an outside wall 18 with essentially circular cross-sections.

The air intake 12 is connected to the power plant by flange-type connecting means 20 comprising, on the one hand at the end of the inside pipe 16, an annular collar 22 that offers a first support surface, and, on the other hand at the power plant, an annular collar 24 that offers a second support surface that can rest against the first, whereby bolts 26, rivets or the like are distributed over the circumference of the collars 22 and 24 to keep them flattened against one another and to thus ensure the connection between the air intake and the power plant.

Techniques developed for reducing the noise emitted by an aircraft, and in particular the noise that is emitted by the propulsion systems, consist in placing—in particular at the wall of the inside pipe 16—a coating 28 whose purpose is to absorb a portion of the sound energy, in particular by using the principle of Helmholtz resonators. So as to optimize the acoustic treatment, this coating 28 should extend over the largest surface and generally extends from the collar 22 up to the lip 14.

In a known manner, a coating for the acoustic treatment 28, also called an acoustic attenuation panel, comprises—from the outside to the inside—an acoustically resistive porous layer 30, at least one alveolar structure 32, and a reflective or impermeable layer 34.

The acoustically resistive layer is a porous structure that has a dissipative role, partially transforming the acoustic energy of the sound wave that passes through it into heat. It comprises so-called open zones that are able to allow the acoustic waves to pass and other so-called closed or solid zones that do not allow the sound waves to pass but are designed to ensure the mechanical strength of said layer. This acoustically resistive layer is characterized in particular by an open surface area ratio that varies essentially as a function of the engine, components that constitute said layer.

So as to improve the performances of the acoustic treatment, it is necessary to determine with the most precision possible the acoustic signature of the power plant. For this purpose, it is necessary to put the measuring devices, such as microphones, as close as possible to the blades of the engine and in a number that is determined based on the desired measurements.

To take a satisfactory measurement, it is preferable to place the measuring devices perpendicular to the surface that is in contact with the stream of air and to hold them there perfectly. In addition, these measuring devices should not disturb the stream entering into the engine, without which the noises emitted by said engine would be different and should therefore be placed flush with the surface in contact with the streams of air.

Also, the purpose of this invention is to propose a support of at least one measuring device that optimizes taking a measurement.

For this purpose, the invention has as its object an aircraft nacelle that comprises an air intake that makes it possible to channel a stream of air in the direction of a power plant, whereby said air intake comprises an inside pipe that forms an aerodynamic surface that is in contact with the stream of air extended toward the rear by an aerodynamic surface of a pipe of the power plant, characterized in that it comprises a support of at least one measuring device, whereby said support, in annular form, is able to be inserted in a removable way between the air intake and the power plant and comprises a so-called aerodynamic surface that can ensure the continuity of the aerodynamic surfaces that are arranged downstream and upstream according to the direction of flow of the stream of air.

Figure 2:
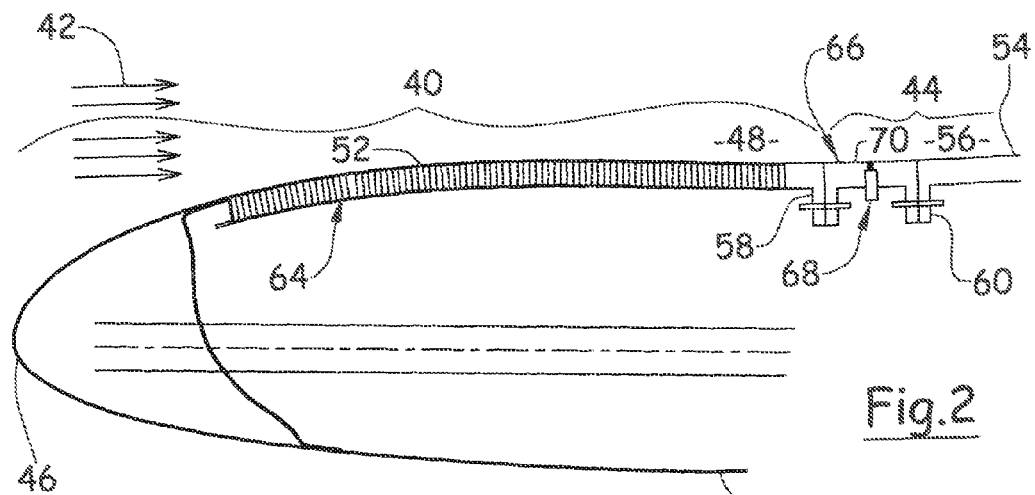
Figure 3:
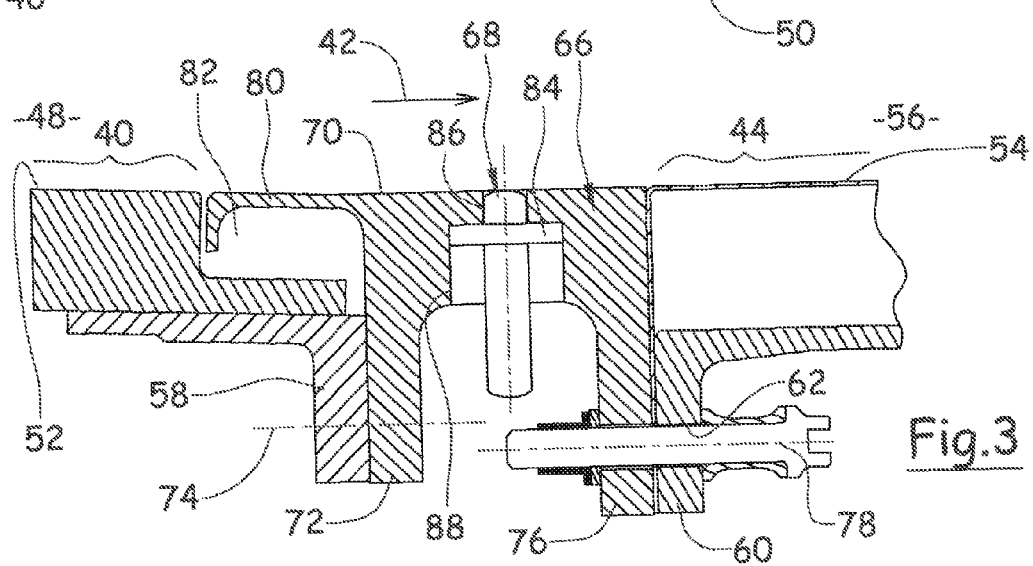
Figure 4:
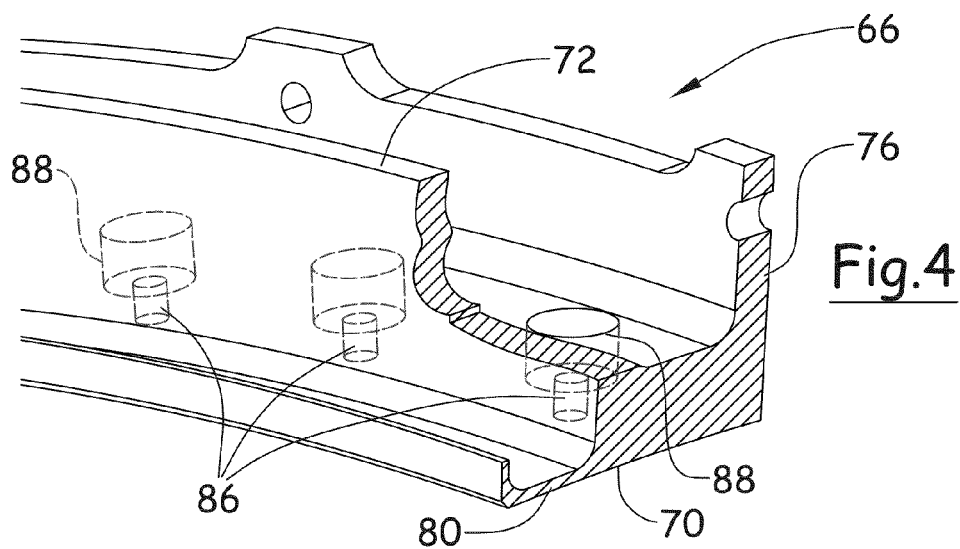
Figure 5:
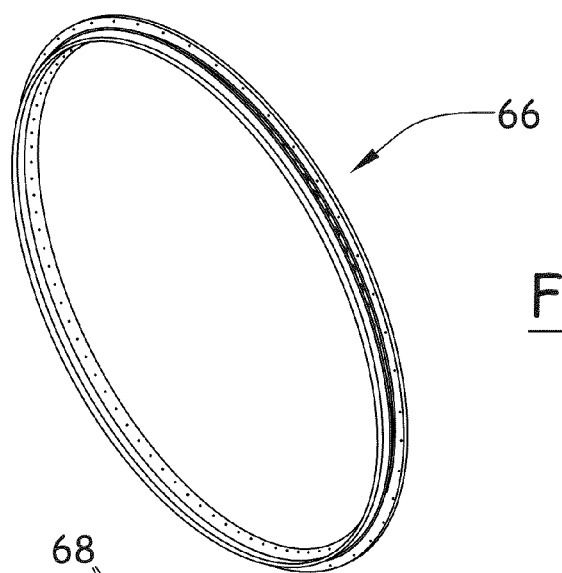
Figure 6:
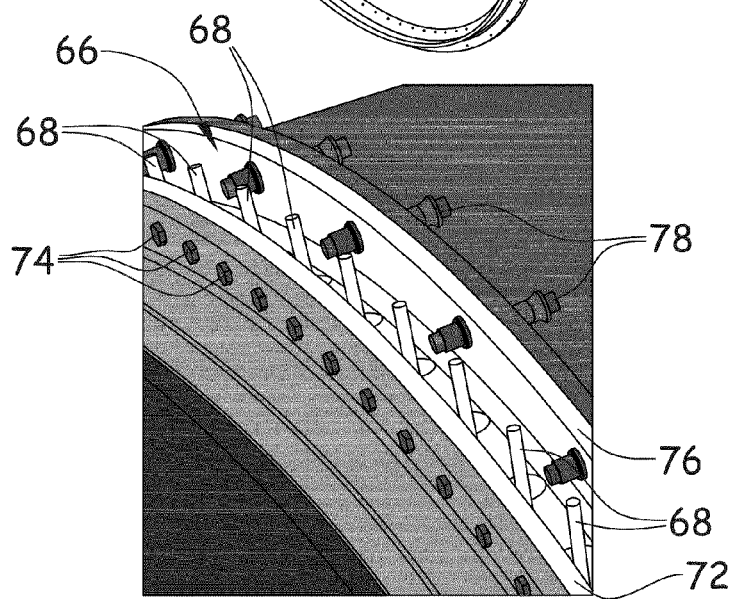

Other characteristics and advantages will emerge from the following description of the invention, a description that is provided only by way of example, relative to the accompanying drawings, in which:

FIG. 1 is a cutaway along a radial plane of a portion of the front of an aircraft nacelle according to the prior art, FIG. 2 is a cutaway along a radial plane of a portion of the front of an aircraft nacelle according to the invention, FIG. 3 is a cutaway along a radial plane that affords a detailed illustration of a support of at least one measuring device that is inserted between an air intake and a power plant of an aircraft nacelle, FIG. 4 is a perspective view of a portion of the support of FIG. 3, FIG. 5 is a perspective view of the support of FIG. 3, and FIG. 6 is a perspective view that affords a detailed illustration of a support according to the invention as well as its means for connecting to the air intake and to the power plant, whereby said support is equipped with measuring devices.

FIG. 2 shows a portion of the front of a nacelle of an aircraft that at 40 comprises an air intake that makes it possible to channel a stream of air 42 in the direction of a power plant 44.

Hereinafter, longitudinal direction is defined as a direction that is parallel to the longitudinal axis of the power plant.

The air intake 40 comprises a lip 46 whose surface that is in contact with the incoming stream of 42 is extended inside the nacelle via an inside pipe 48 with essentially circular cross-sections and outside of the nacelle via an outside wall 50 with essentially circular cross-sections.

The inside pipe 48 comprises an aerodynamic surface 52 that is contact with the stream of air 42 that extends toward the rear of the nacelle by an aerodynamic surface 54 of a pipe 56 of the power plant.

At the rear, the inside pipe 48 of the air intake comprises a ring-shaped edge opposite a ring-shaped edge of the pipe 56 of the power plant.

According to an embodiment that affords a detailed illustration in FIG. 3, the inside pipe 48 comprises an annular collar 58 that comprises a first support surface that forms the rear edge of said inside pipe 48. Opposite, the pipe 56 of the power plant comprises an annular collar 60 that comprises a second support surface that forms the front edge of said pipe 56 that is essentially parallel to the first support surface.

The collars 58 and 60 comprise openings 62 that can make possible the passage of rods, arranged opposite, spaced and distributed over the circumference of the collars.

Advantageously, the inside pipe 48 comprises a coating for the acoustic treatment 64, also called an acoustic attenuation panel, comprising—from the outside to the inside—an acoustically resistive porous layer, at least one alveolar structure, and a reflective or impermeable layer, whereby the acoustically resistive layer forms the aerodynamic surface 52.

The power plant, the air intake, as well as the acoustic attenuation panel are not presented in more detail because they are known to one skilled in the art.

According to the invention, the nacelle comprises a support 66 of at least one measuring device 68, independent of the power plant and the air intake.

As illustrated in FIG. 5, this ring-shaped support 66 comprises a so-called aerodynamic surface 70 that can ensure the continuity of the aerodynamic surfaces 52 and 54 that are arranged downstream and upstream in the direction of flow of the stream of air 42. This support can be made of one or more parts.

This arrangement makes it possible to limit the effects of the support on the stream of air 42.

In addition, the support 66 comprises the first connecting means for ensuring the transmission of forces between the air intake 40 and said support 66 and second connecting means for ensuring the transmission of forces between the power plant 44 and said support 66. Preferably, the connecting means that bind the support to the air intake and to the power plant make it possible to make it detachable. To ensure the transmission of forces between the air intake 40 and the power plant 44, the support 66 has suitable shapes.

According to one embodiment that is illustrated in FIGS. 2 to 4, the support 66 has an essentially constant cross-section over its circumference, in the shape of a U, the base of the U forming the aerodynamic surface 70, the branches of the U forming the support surfaces opposite, on the one hand, the rear edge of the air intake and, on the other hand, the front edge of the power plant.

According to one embodiment that affords a detailed illustration in FIG. 6, one of the branches of the U of the support 66 forms an annular collar 72 that comprises a support surface that can be flattened against the support surface of the annular collar 58 of the inside pipe 48. The first connecting means comprise bolts, rivets 74 or the like, distributed over the circumference of the support 66, for keeping the collars 58 and 72 flattened against one another and for ensuring the transmission of forces between the air intake 40 and the support 66.

According to one embodiment that affords a detailed illustration in FIG. 6, the other branch of the U of the support 66 forms an annular collar 76 that comprises a support surface that can be flattened against the support surface of the annular collar 60 of the pipe 56 of the power plant. The second connecting means comprise bolts, rivets 78 or the like, distributed over the circumference of the support 66 for keeping the collars 60 and 76 flattened against one another and for ensuring the transmission of forces between the power plant 44 and the support 66.

Based on the geometry of the air intake or the power plant, the support 66 can comprise at least one extension 80 that increases the surface area of the aerodynamic surface 70 so as to cover a possible offset 82 that is provided at the front edge of the power plant and/or the rear edge of the air intake, as illustrated in FIG. 3. According to the illustrated example, the offset 82 is used in the mounting of the support 66, in particular by housing certain elements of the connection between the rear edge of the air intake and the support 66, whereby the extension 82 covers the attachment and isolates it from the aerodynamic stream so as to reduce the disturbances.

According to one embodiment, the support 66 is equipped with measuring devices 68. In this case, microphones are distributed over the entire circumference. According to one embodiment, a microphone has a cylindrical shape with a shoulder 84.

As illustrated in FIGS. 4 and 6, the base of the U of the support 66 comprises, for each microphone, a through hole 86 that empties out at the aerodynamic surface 70. Opposite the aerodynamic surface 70, the hole 86 comprises a counterbore 88 whose diameter is adapted to that of the shoulder 84 of the microphone that is to be attached. According to this configuration, each microphone is kept in a hole 86 so as to be essentially perpendicular to the aerodynamic surface 70, whereby its end is essentially flush with said surface 70 so as not to interfere with the stream of air 42. Any offset toward the inside or toward the outside of more than 0.1 mm would generate turbulence. Each microphone 68 is fixed in the hole by any suitable means, for example by bonding, by screwing, etc.

The thus equipped support 66 makes it possible to obtain an optimal taking of measurements because the microphones 68 are placed perpendicular and close to the surface that is in contact with the stream of air 42, do not disturb the stream of air, and are held there perfectly. Finally, whereby the support 66 is removable, it can be withdrawn from the nacelle after a series of measurements, whereby the air intake is then made integral directly with the power plant.

The invention claimed is:

1. An aircraft nacelle comprising:
a power plant comprising a pipe with an aerodynamic surface;
an air intake configured to channel a stream of air toward said power plant, said air intake comprising an inside pipe with an aerodynamic surface configured to contact the stream of air; and
an annular support of at least one measuring device, said annular support comprising an aerodynamic surface and a U-shaped cross-section with a base and two branches; wherein:
said annular support is removably inserted downstream of said air intake and upstream of said power plant in a direction of flow of the stream of air, in such a way as to ensure continuity of said aerodynamic surface of the air intake, said aerodynamic surface of the annular support, and said aerodynamic surface of the power plant;
the base of the U-shaped cross-section of the annular support comprises, for each of said at least one measuring devices, a through hole opening on the aerodynamic surface of the annular support; and
each through hole receives a measuring device, such that said measuring device is maintained essentially perpendicular to the aerodynamic surface of the annular support, wherein an end of said measuring device is essentially flush with said aerodynamic surface of the annular support, so as not to interfere with the stream of air.

2. The aircraft nacelle according to claim 1, wherein said annular support comprises at least one first connecting element to transmit forces between said air intake and said annular support, and at least one second connecting element to transmit forces between said power plant and said annular support.

3. The aircraft nacelle according to claim 2, wherein the base of the U-shaped cross-section forms the aerodynamic surface of the annular support, and the branches of the U-shaped cross-section forms support surfaces, wherein one support surface faces a rear edge of the air intake and the other support surface faces a front edge of the power plant.

4. The aircraft nacelle according to claim 3, wherein one of the branches of the U-shaped cross-section of the annular support forms an annular collar that comprises a support surface that can be connected to a support surface of an annular collar of the inside pipe of the air intake, wherein the at least one first connecting elements, distributed over a circumference of the annular support, keep said annular collar formed by the annular support and said annular collar of the inside pipe of the air intake pressed flush against each other, and transmit forces between the air intake and the annular support.

5. The aircraft nacelle according to claim 3, wherein one of the branches of the U-shaped cross-section of the annular support forms an annular collar that comprises a support surface that can be connected to the support surface of an annular collar of the pipe of the power plant, wherein the at least one second connecting elements, distributed over the circumference of the annular support, keep said annular collar formed by the annular support and said annular collar of the pipe of the power plant pressed flush against each other, and transmit forces between the power plant and the annular support.

* * * * *